United States Patent
Finkelstein

(10) Patent No.: US 7,571,887 B2
(45) Date of Patent: Aug. 11, 2009

(54) HEIGHT ADJUSTABLE SUPPORT FOR FOOD SERVICE EQUIPMENT

(75) Inventor: Burl M. Finkelstein, Newnan, GA (US)

(73) Assignee: Kason Industries, Inc., Shenandoah, GA (US)

( * ) Notice: Subject to any disclaimer, the term of this patent is extended or adjusted under 35 U.S.C. 154(b) by 0 days.

(21) Appl. No.: 11/952,209

(22) Filed: Dec. 7, 2007

(65) Prior Publication Data
US 2009/0146023 A1    Jun. 11, 2009

(51) Int. Cl.
*F16M 11/24* (2006.01)
(52) U.S. Cl. .............. 248/650; 248/188.4; 248/656
(58) Field of Classification Search ........... 248/650, 248/656, 188.2, 188.4, 188.5, 188.8; 16/19, 16/30, 32, 33; 108/144.11; 297/344.18
See application file for complete search history.

(56) References Cited

U.S. PATENT DOCUMENTS

| | | | |
|---|---|---|---|
| 1,408,588 A | | 3/1922 | Growald |
| 2,339,577 A | | 1/1944 | Nalle |
| 2,365,287 A | | 1/1944 | Nalle |
| 2,384,020 A | | 9/1945 | Farson |
| 2,385,154 A | | 9/1945 | Nalle |
| 2,403,338 A | | 7/1946 | Butler |
| 2,504,291 A | * | 4/1950 | Alderfer ............ 254/98 |
| 2,534,575 A | | 12/1950 | Conley et al. |
| 2,592,942 A | * | 4/1952 | Moore ............ 248/184.1 |
| 2,670,748 A | | 3/1954 | Greene et al. |
| 2,730,419 A | * | 1/1956 | Roberton et al. .......... 108/156 |
| 2,828,578 A | | 4/1958 | McCabe |
| 3,329,105 A | | 7/1967 | McPherson |
| 4,043,239 A | * | 8/1977 | DeFusco ............ 411/337 |
| 4,061,298 A | * | 12/1977 | Kober ............ 248/677 |
| 4,151,853 A | | 5/1979 | Inbar |
| 4,313,586 A | * | 2/1982 | Grzesnikowski ......... 248/188.4 |
| 4,723,633 A | | 2/1988 | Duncan |
| 4,840,094 A | * | 6/1989 | Macor ............ 81/185 |
| 4,918,783 A | | 4/1990 | Chu |
| 5,001,808 A | | 3/1991 | Chung |
| 5,040,758 A | | 8/1991 | Giovannetti |
| D334,136 S | | 3/1993 | McCord et al. |
| 5,457,849 A | | 10/1995 | Branson et al. |
| 5,536,068 A | | 7/1996 | Valentor et al. |
| 5,881,980 A | | 3/1999 | Knudson |
| 6,327,985 B1 | * | 12/2001 | Frenkler et al. ......... 108/147.19 |
| 6,354,231 B1 | | 3/2002 | Morris |
| 6,478,270 B2 | * | 11/2002 | Parisi et al. ............ 248/188.8 |
| 6,568,757 B2 | | 5/2003 | Lin et al. |
| 6,796,001 B1 | * | 9/2004 | Finkelstein ............ 16/32 |
| 6,799,660 B1 | | 10/2004 | Crawford |
| 6,839,937 B2 | * | 1/2005 | Miller ............ 16/32 |
| 7,159,829 B1 | | 1/2007 | Finkelstein |
| 7,267,309 B2 | * | 9/2007 | Hanson ............ 248/188.4 |

* cited by examiner

*Primary Examiner*—Korie H. Chan
(74) *Attorney, Agent, or Firm*—Baker Donelson et al.

(57) ABSTRACT

A support (10) is disclosed for use with food service equipment. The support has a tubular upper portion (11) and a tubular lower portion (12) telescopically mounted within the upper portion for adjustable vertical movement. The upper portion has a support body (15) and a steel, externally threaded stud (17). The lower portion includes a plastic, tubular foot (20) having a channel (21) with a t-shaped portion defined by a first portion (22) and a second portion (23). The lower portion also includes a t-shaped metal insert (25) mounted within the t-shaped portion of the channel. The insert is threaded onto the bottom end of the threaded stud for threaded vertical movement along the stud.

9 Claims, 2 Drawing Sheets

Fig. 1
(Prior Art)
Fig. 2
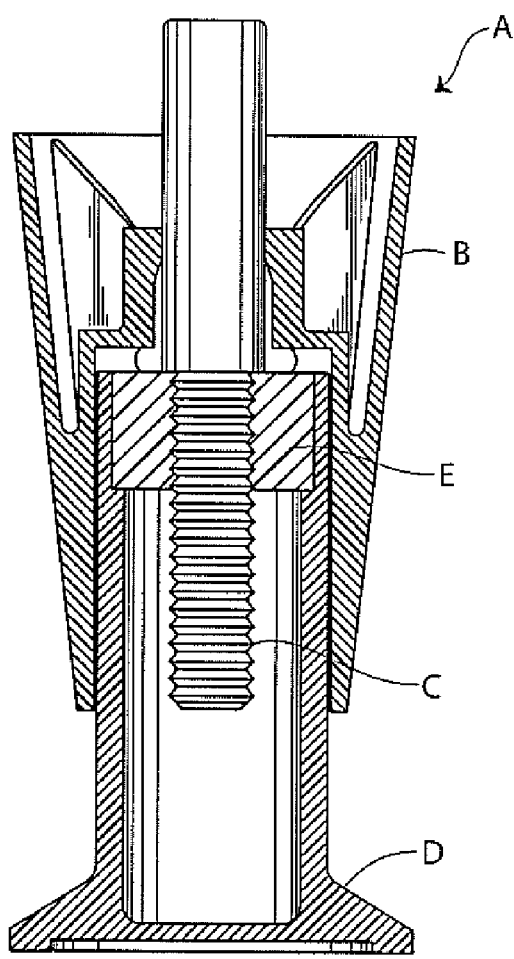
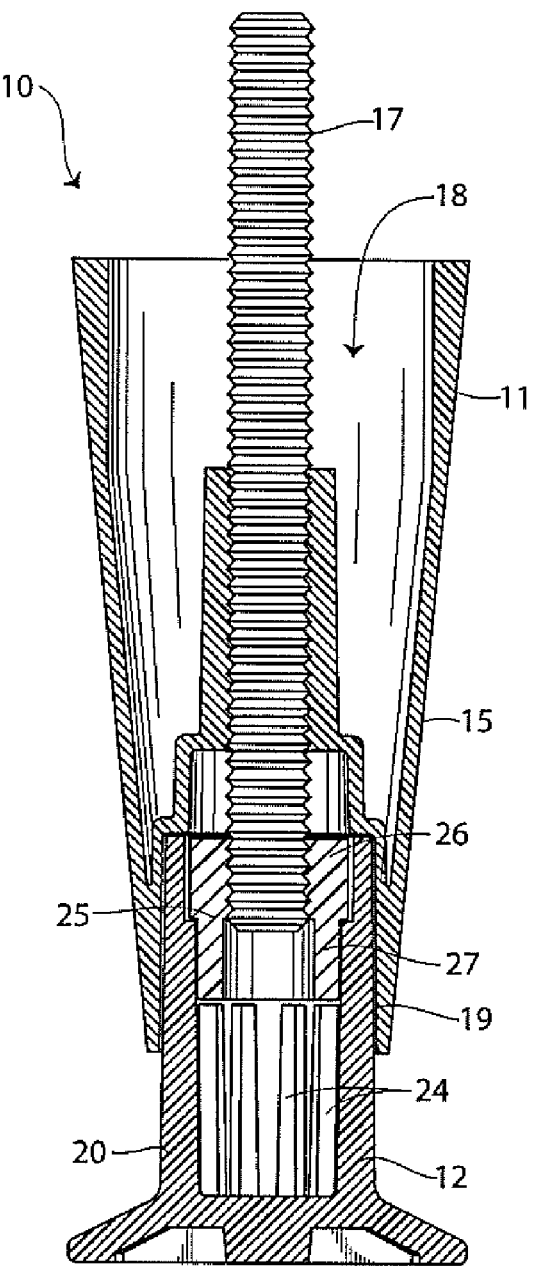

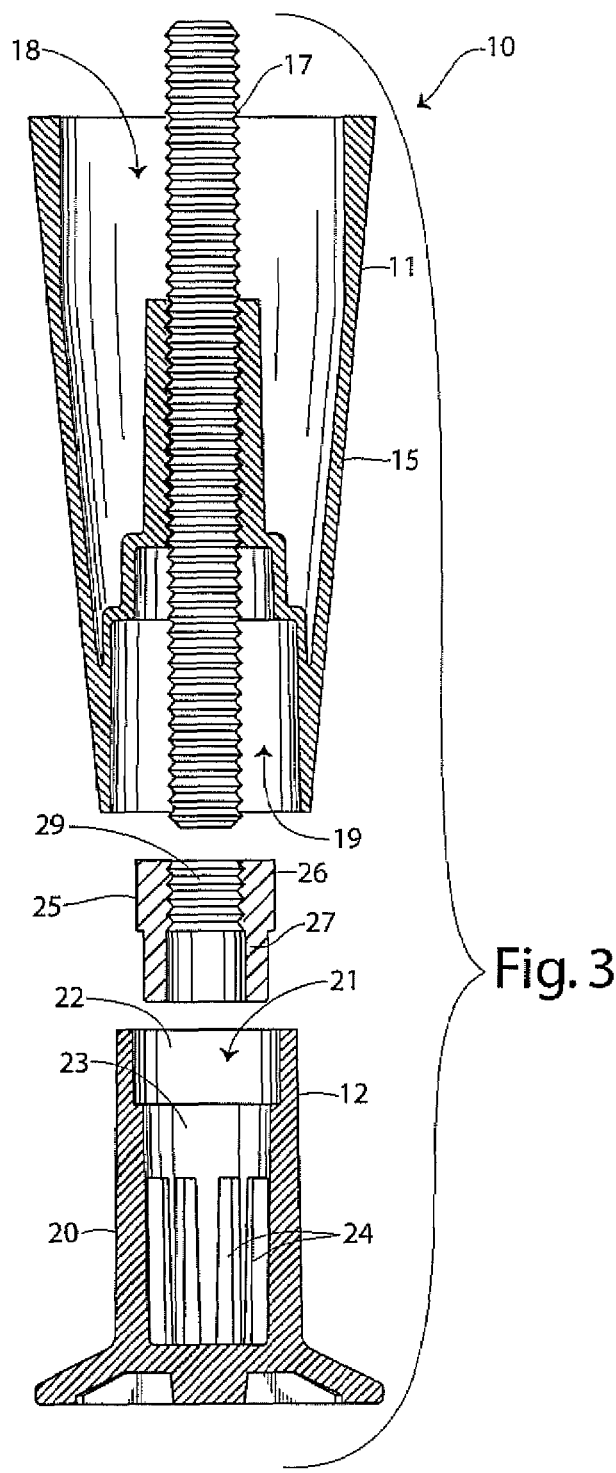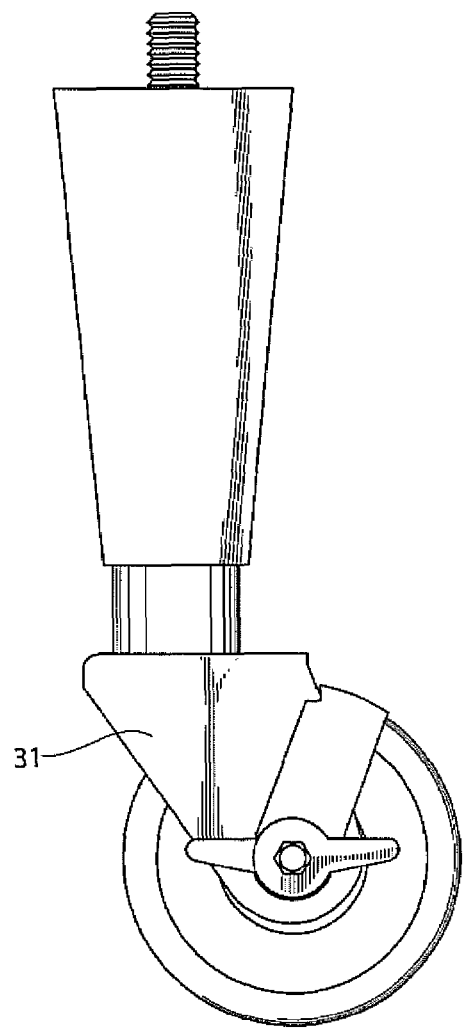
Fig. 3
Fig. 4

HEIGHT ADJUSTABLE SUPPORT FOR FOOD SERVICE EQUIPMENT

TECHNICAL FIELD

This invention relates generally to supports for commercial food service equipment, and particularly to height adjustable legs and casters for such equipment.

BACKGROUND OF THE INVENTION

Commercial food service equipment is often supported upon a floor by legs or casters. Most equipment in commercial kitchens is set to a common work height. Adjustable legs and leveling devices are used to allow for height adjustments to achieve a common height regardless of factory preset heights. Height adjustments are also needed where the floor is not level or even.

Casters are usually not adjustable in height. Those few that are normally require different mountings than those for the fixed legs or feet that they replace. For safety these must be designed so that a leg or caster may not come off during adjustment. These thus have tended to require rather complex machined adjustment components as exemplified by that shown in U.S. Pat. No. Des 334,136.

In addition, food service equipment often needs to be adopted to either a mobile or immobile configuration at installation. For example, pizza ovens installed in a pizzeria normally have fixed legs while those installed in a convention center have casters for relocation from time to time. Ease of convertibility without the need for change in the equipment's legs or leg sockets is thus desirable.

A problem with food service equipment is that these legs have typically been made of zinc die casting alloys. These alloys have become very expensive. As such, legs have been designed which are made in large part of plastic materials. As shown in FIG. 1, these legs A have a leg portion B with a central stud C and a foot portion D with a central nut E press fitted in the plastic foot and rotatable along the stud. The drawback of these plastic legs that mimic metal leg dimensions is that they do not bear well with side loading and they do not withstand creep deformation. Typical failures occur in the foot area where a metal load bearing nut deforms the plastic and fails the leg.

Side loads occur when a piece of equipment is slid upon the floor and it encounters a sudden stop, as when the foot hits a seam in the floor or when equipment is tilted on its end. This can cause a twist of the conventional nut on its longitudinal axis within the plastic foot, thereby forcing the nut into the plastic or barreling the foot causing it to become unrotatable along the stud.

Accordingly, it is seen that a need remains for height adjustable supports for food service equipment of more economical yet sturdy construction. It is to the provision of such that the present invention is primarily directed.

SUMMARY OF THE INVENTION

In a preferred form of the invention a height adjustable support is provided for supporting food service equipment and the like at different elevations above a supporting floor. The support comprises a leg having a body with a central passage therethrough, an externally threaded stud fixedly mounted within the body central passage, and a plastic foot having a channel therein including a t-shaped channel portion adjacent a top end of the foot. The foot also includes a t-shaped insert having a threaded passage therein configured to threadably receive the stud for threaded movement along the stud. The t-shaped insert is tightly received within the t-shaped channel portion. With this construction, the support may be coupled to a food service equipment by threading the top end of the threaded stud into the equipment and whereby the height of the equipment may be adjusted by threadably positioning the foot along the lower end of the threaded stud.

BRIEF DESCRIPTION OF THE DRAWING

FIG. 1 is a cross-sectional view of a prior art height adjustable support.

FIG. 2 is a cross-sectional view of a height adjustable support that embodies the invention in a preferred form shown positioned beneath the bottom of food service equipment leg for mounting.

FIG. 3 is an exploded view of the height adjustable support of FIG. 1.

FIG. 4 is a side view of a height adjusted support shown in another preferred embodiment.

DETAILED DESCRIPTION

With reference now in more detail to the drawing, there is shown in FIGS. 2 and 3 a height adjustable support and a fragment of the bottom portion of a piece of food service equipment. Where the food service equipment is generally rectangular, as it often is, it may have a leg adjacent each of its four bottom corners. Of course it may have more, depending upon its size and weight. In this case the food service equipment, shown in phantom lines, has an internally threaded channel therein. Positioned beneath the equipment for mounting thereto is a leg in the form of a height adjustable support 10 embodying principles of the present invention.

Each support 10 has a tubular upper or leg portion 11 and a tubular lower or foot portion 12 telescopically mounted within the upper portion 11 for adjustable vertical or longitudinal movement. The upper portion 11 has a plastic support body 15. The support body 15 is molded about a centralized, zinc plated steel, externally threaded stud or post 17. The support body 15 prevents rotational movement of the threaded stud 17. The combination of the body 15 and stud 17 forms an annularly-shaped top recess 18 and an annularly-shaped bottom recess 19.

The lower portion 12 includes a plastic, tubular foot 20 having a longitudinal central channel 21. Channel 21 has a first portion 22 having a first selected internal diameter and a second portion 23 having a second selected internal diameter. The first portion 22 selected internal diameter is larger than the second portion 23 selected internal diameter, the first and second portions 22 and 23 forming a stepped or t-shaped portion of channel 21. The channel 21 also includes an annular array of longitudinally extending ribs 24. The ribs 24 terminate below the junction between the first portion 22 and second portion 23 and thereby form a partial floor.

A stepped or t-shaped metal insert or nut 25 is press fitted or otherwise mounted within the lower portion channel 21. The insert 25 has a first portion 26 with external knurling and an external diameter corresponding to the channel first portion 22 internal diameter, and a second portion 27 with an external diameter corresponding to the channel second portion 23 internal diameter. As such, the metal insert includes a "stepped" or "t-shaped" configuration. The bottom surface of the second portion 27 rests upon the top of the ribs 24. The metal insert 25 has an internally threaded, central channel 29 extending completely therethrough which corresponds to the threading of stud 17.

The insert 25 is threaded onto the bottom end of the threaded stud 17 for threaded vertical movement along the stud. It should be noted that the bottom end of the stud 17 is deformed once the inserted is threaded thereon in order to prevent the lower portion 12 from being accidently dismounted from the upper portion 11 during adjustable movement. Such accidental disengagement of the leg can pose a significant hazard as it may cause material upon the equipment, such as gallons of hot oil, to spill or the equipment to fall upon a person adjusting the leg.

The stepped configuration of the insert 25 provides a good radial coupling between the plastic foot and metal insert via the knurling along the first portion 26 of the insert. The intermediate step absorbs thrust or weight loading in unison with the lower diameter of the insert that is resting upon the ribs 24. This configuration provides more longitudinal bearing surface than a simply hex or round nut or insert within a hole, as shown in the prior art device of FIG. 1. The spreading out of the load bearing points prevents the plastic of the foot from flowing under load, a problem associated with the prior art devices. The stepped configuration also encircles the load bearing points of the plastic with a greater thickness of the restraining material to aid in restricting barreling and failure of the leg. This increase in strength is attributed, at least partially, to the second portion 27 of the insert having a higher ratio of length to diameter than that of the prior art devices wherein in a larger diameter insert is easier to tip within the plastic foot when a side load is applied, i.e., the smaller, stepped insert is more resistant to being torqued out of the plastic.

In mounting the support 10 to the equipment the top end of the stud 17 is threaded into the threaded channel of the equipment. The lower portion 12 is then rotated relative to the upper portion 11, thereby threading it along the stud 17 to a desired height. If needed, the height may be later reset by simply rotating the lower portion so as to change the overall height of the equipment.

With reference next to FIG. 4, there is shown another preferred form of the invention. Here the support is essentially the same as that previously described in reference to FIGS. 2 and 3 except for the addition of a wheel assembly 31. Both the castor configuration of FIGS. 2 and 3 or the wheeled assembly configuration of FIG. 4 may be considered a floor engaging member.

It should also be understood that the support may be mounted to the bottom of a stationary leg of a piece of equipment.

It thus is seen that a height adjustable support is now provided for food service equipment that is of simple and safe construction. Though the support is principally designed for use on food service equipment, it may of course be used on other floor supported items that need height adjustment. And though the invention has been shown and described in its preferred form, it should be understood that additions, deletions and modifications may be made without departure from the spirit and scope of the invention as set forth in the following claims.

The invention claimed is:

1. A height adjustable support for supporting food service equipment at different elevations above a supporting floor, the height adjustable support being adapted to be mounted to the bottom end of the food service equipment, and which comprises an upper portion and a lower portion, said upper portion having a tubular body and an externally threaded stud fixedly mounted concentrically within said tubular body, said stud having a top section and a bottom section opposite said top section, said lower portion having a foot with a channel therein having a channel first portion adjacent a top end of said foot with a select internal diameter and a channel second portion spaced from said top end and extending from said channel first portion, said channel second portion having an internal diameter less than said channel first portion internal diameter, the height adjustable support lower portion also including an internally threaded insert adapted to be threadably coupled to said stud bottom section, said insert having an insert first portion with a first select external diameter configured to be received tightly within said foot channel first portion and an insert second portion with a second select external diameter smaller that said channel first portion first select external diameter and configured to be received tightly within said foot channel second portion, wherein said foot channel also includes at least one projection and wherein said insert second portion contacts said at least one projection, whereby the support may be coupled onto a food service equipment by threading the top section of the stud into the equipment and whereby the height of the equipment may be adjusted by threadably positioning the lower portion along the bottom section of the threaded stud.

2. The support of claim 1 wherein said at least one projection of said channel comprises an annular array of longitudinally extending ribs.

3. The support of claim 1 wherein said lower portion is a wheel assembly.

4. A height adjustable support for supporting food service equipment at different elevations above a supporting floor, the height adjustable support being adapted to be mounted to the bottom end of the food service equipment, and which comprises a leg having a body with a central passage therethrough, an externally threaded stud fixedly mounted within said body central passage, and a plastic foot having a channel therein including a t-shaped channel portion adjacent a top end of said foot, said foot also including a t-shaped insert having a threaded passage therein configured to threadably receive said stud for threaded movement along said stud, said t-shaped insert being tightly received within said t-shaped channel portion, wherein said foot channel also includes at least one projection and wherein said t-shaped insert contacts said at least one projection whereby the support may be coupled to a food service equipment by threading the top end of the threaded stud into the equipment and whereby the height of the equipment may be adjusted by threadably positioning the foot along the lower end of the threaded stud.

5. The support of claim 4 wherein said at least one projection of said channel comprises an annular array of longitudinally extending ribs.

6. The support of claim 4 wherein said foot is a wheeled leg.

7. A height adjustable support for supporting food service equipment at different elevations above a supporting floor, the height adjustable support being adapted to be mounted to the bottom end of the food service equipment, and which comprises, a leg with an externally threaded stud, a plastic foot having a channel therein with a first channel portion of a select size and a second channel portion extending from said first channel portion and having a select size smaller than said first channel portion select size, and an insert having a threaded passage therein configured to threadably receive said stud for threaded movement along said stud, said insert having a first insert portion configured to conform with said foot first channel portion and a second insert portion extending from said first insert portion and being configured to conform with said foot second channel portion, wherein said foot channel also includes at least one projection and wherein said second insert portion contacts said at least one projection, whereby the support may be coupled to a food service equipment by threading the top end of the threaded stud into the equipment and whereby the height of the equipment may be adjusted by threadably positioning the foot along the lower end of the threaded stud.

8. The support of claim 7 wherein said at least one projection of said channel comprises an annular array of longitudinally extending ribs.

9. The support of claim 7 wherein said foot is a wheeled leg.

* * * * *